United States Patent [19]

Siddall et al.

[11] 3,759,964
[45] Sept. 18, 1973

[54] DIHALOMETHYLENE SUBSTITUTED ESTERS AND DERIVATIVES

[75] Inventors: John B. Siddall, Palo Alto, Calif.; Jean Pierre Calame, Locarno, Switzerland

[73] Assignee: Zoecon Corporation, Palo Alto, Calif.

[22] Filed: Mar. 19, 1971

[21] Appl. No.: 126,297

Related U.S. Application Data

[60] Division of Ser. No. 843,818, July 22, 1969, Pat. No. 3,641,558, which is a continuation-in-part of Ser. No. 800,266, Feb. 18, 1969, which is a continuation-in-part of Ser. No. 618,351, Feb. 24, 1967, which is a continuation-in-part of Ser. No. 579,490, Sept. 15, 1966, which is a continuation-in-part of Ser. No. 590,195, Oct. 28, 1966, which is a continuation-in-part of Ser. No. 592,324, Nov. 7, 1966, which is a continuation-in-part of Ser. No. 594,664, Nov. 16, 1966, which is a continuation-in-part of Ser. No. 605,566, Dec. 29, 1966, which is a continuation-in-part of Ser. No. 605,578, Dec. 29, 1966.

[52] U.S. Cl............ 260/408, 260/468 P, 260/514 P, 424/DIG. 12

[51] Int. Cl..... C07c 69/74, C07c 61/12, A01n 9/24
[58] Field of Search............. 260/408, 468 P, 514 H

[56] References Cited

UNITED STATES PATENTS

| 3,074,984 | 1/1963 | Simmons, Jr. ...................... 260/414 |
| 3,413,351 | 11/1968 | Eschenmoser et al.............. 260/586 |
| 3,355,481 | 11/1967 | Olechowski......................... 260/468 |

*Primary Examiner*—Lewis Gotts
*Assistant Examiner*—Diana G. Rivers
*Attorney*—Donald W. Erickson

[57] ABSTRACT

Novel aliphatic hydrocarbon esters, acids and alcohols having a backbone of at least 12 carbon atoms, a lower alkyl group at C–3, C—7 and C—11 and unsaturation or saturation at C—2,3, C—6,7 and/or C—10, 11 which are substituents with, for example, halo, hydroxy, methylene, oxido, dihalo-methylene, and the like, and the esters and ethers of said hydroxy substituent useful as arthropod maturation inhibitors.

7 Claims, No Drawings

DIHALOMETHYLENE SUBSTITUTED ESTERS AND DERIVATIVES

This is a division of application Ser. No. 843,818, filed July 22, 1969 now U.S. Pat. 3,671,558, which in turn is a continuation-in-part of U.S. application Ser. No. 800,266, filed Feb. 18, 1969, which is a continuation-in-part of U.S. application Ser. No. 618,351, filed Feb. 24, 1967, which, in turn, is a continuation-in-part of the following U.S. applications: Ser. No. 579,490, filed Sept. 15, 1966; Ser. No. 590,195, filed Oct.28, 1966; Ser. No. 592,324, filed Nov. 7, 1966; Ser. No. 5-94,664, filed Nov. 16, 1966; Ser. No. 605,566, filed Dec. 29, 1966; and Ser. No. 605,578, filed Dec. 29, 1966 all now abandoned.

This invention relates to novel aliphatic hydrocarbon ester derivatives and to processes for their preparation.

More particularly, the present invention relates to novel substituted aliphatic hydrocarbon esters, substituted aliphatic hydrocarbon acids and substituted aliphatic hydrocarbon alcohols (and the ethers and esters of said alcohols) having a backbone chain of 12 to 17 carbon atoms and a lower alkyl group at positions C—3, C—7 and C—11. These substituted aliphatic hydrocarbons can be prepared according to several methods described hereinafter. One method is to first prepare a substituted aliphatic hydrocarbon ester and then convert the substituted ester into the acid or alcohol to obtain novel substituted aliphatic hydrocarbon acids and alcohols (the alcohol, thereafter, can be converted into the ether or ester). Alternatively, an unsubstituted aliphatic hydrocarbon ester is first converted into the corresponding acid or alcohol and thereafter the acid or alcohol is substituted according to the procedures described hereinafter.

The terms "aliphatic hydrocarbon ester," "aliphatic hydrocarbon acid," and "aliphatic hydrocarbon alcohol," as used herein, refers to compounds characterized by the following formula:

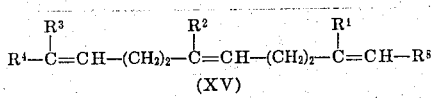

(XV)

wherein each of $R^1$, $R^2$, $R^3$ and $R^4$ is a lower alkyl group and $R^8$ represents the group

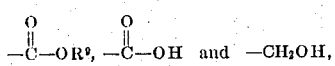

wherein $R^9$ is a lower alkyl group and the corresponding 2,3-dihydro; 6,7-dihydro; 10,11-dihydro; 2,3;6,7-tetrahydro; 6,7;10,11-tetra-hydro and 2,3;10,11-tetrahydro compounds of the above formula.

The terms "substituted aliphatic hydrocarbon ester," "substituted aliphatic hydrocarbon acid" and "substituted aliphatic hydrocarbon alcohol" refer to compounds of formula XV above containing substituents, at one or more of positions C-2, C-3, C-6, C-7, C-10 and C-11 as described hereinafter, see, for example, formulas A', XVI through XXVIII and the examples.

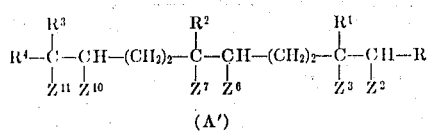

(A')

wherein,
each of $R^1$, $R^2$, $R^3$ and $R^4$ is lower alkyl;
$Z^2$ is hydrogen, hydroxy and ethers thereof, bromo, chloro of fluoro;
$Z^3$ is hydrogen, hydroxy and esters and ethers thereof, bromo, chloro, fluoro, or, when taken together with $Z^2$, is a carbon-carbon double bond between C—2,3 or one of the groups

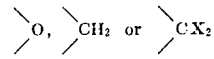

in which X is chloro or fluoro;
$Z^6$ is hydrogen, hydroxy and esters and ethers thereof, bromo, chloro or fluoro;
$Z^7$ is hydrogen, hydroxy and esters and ethers thereof, bromo, chloro, fluoro, or, when taken together with $Z^6$, is a carbon-carbon double bond between C—6,7 or one of the groups

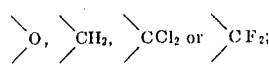

$Z^{10}$ is hydrogen, hydroxy and esters and ethers thereof, bromo, chloro or fluoro;
$Z^{11}$ is hydrogen, hydroxy and esters and ethers thereof, bromo, chloro, fluoro, or, when taken together with $Z^{10}$, is a carbon-carbon double bond between C—10,11 or one of the groups

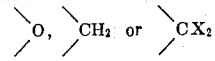

in which X is chloro or fluoro; and
R is the group —COOR' or —$CH_2OR''$ in which R' is hydrogen or lower alkyl and R'' is hydrogen, lower alkyl or carboxylic acyl group; and the acid addition salts of the free acids, provided that when $Z^3$ is hydrogen - then $Z^2$ is hydrogen.

Included within the present invention are the alkali metal and alkaline earth metal salts of the substituted aliphatic hydrocarbon acids. The salts of these acids include sodium, potassium, calcium, magnesium, barium, and the like.

As indicated above, the novel substituted aliphatic hydrocarbon esters, acids and alcohols (including the esters and ethers of said alcohols) can be derived from the compounds of formula XV. The compounds of formula XV can be prepared according to a process outlined as follows wherein $R^1$, $R^2$, $R^3$ and $R^4$ are as defined above, Alk is a lower alkyl group and is phenyl.

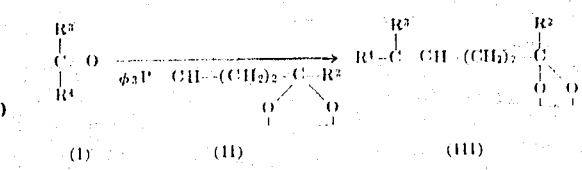

(I)  (II)  (III)

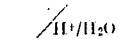

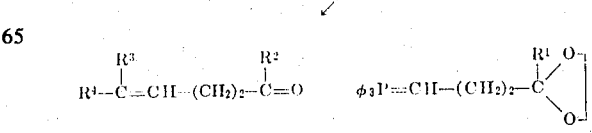

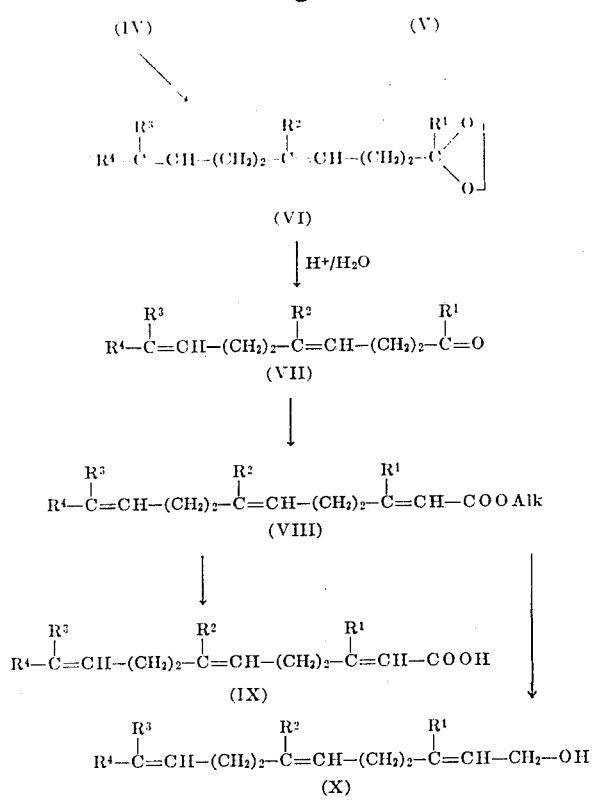

In the practice of the above process (I → X), a dialkyl ketone (I) is reacted with an equal molar quantity, preferably an excess, of the Wittig reagent of Formula II in an organic solvent, e.g., dimethyl sulfoxide, at reflux temperatures to furnish the corresponding substituted Wittig reaction adduct of Formula III.

The Wittig reagent of Formula II can be prepared by conventional procedures, such as is described by Trippett, *Advances in Organic Chemistry*, Vol. 1, pp. 83–102, Trippett, *Quarterly Review*, Vol. 16–17, pp. 406–410; and Greenwald et al., *Journal of Organic Chemistry* 28, 1128 (1963) from the 4-ethylene ketal of a 1-halo-4-alkanone by treatment with triphenylphosphine followed by treatment with butyl or phenyl lithium.

The 4-ethylene ketal of the 1-halo-4-alkanone is obtained by subjecting the 4-keto compound to conventional ketalysis with ethylene glycol in benzene in the presence of an aryl sulfonic acid. The 1-halo-4-alkanone, particularly the 1-bromo derivative, can be prepared by known procedures such as that described in German Pat. No. 801,276 (Dec. 28, 1950), vide *Chemical Abstracts* 45, 2972h and by Jäger et al., *Arch. Pharm.* 293, 896 (1960), vide Chemical Abstracts 55, 3470g. Briefly, these procedures involve treating butyrolactone with the desired alkyl alkanoate to provide the corresponding α-acyl-butyrolactone adduct. Treatment of the latter adduct with alkali metal halide, particularly sodium bromide, in aqueous sulfuric acid then provides the corresponding 1-bromo-4-alkanone. Thus butyrolactone when treated with ethyl acetate gives α-acetylbutyrolactone which is, in turn, converted to 1-bromo-4-pentanone.

Hydrolysis of the Wittig reaction adduct (III) with aqueous acid affords the free ketone (IV).

By repeating the Wittig reaction just described on the thus formed ketone (IV) with the Wittig reagent (V) (prepared as described above), the corresponding diene adduct (VI) is obtained which is then hydrolyzed with aqueous acid to the dienone (VII).

The dienone of Formula VII is then converted into the trienoate of Formula VIII by treatment with a diethyl carboalkoxymethylphosphonate, such as diethyl carbomethoxymethylphosphonate (VIII; Alk is methyl), in the presence of an alkali metal hydride, e.g., sodium hydride.

The aliphatic hydrocarbon ester (trienoate) of Formula VIII can then be converted into the corresponding aliphatic hydrocarbon acid of Formula IX by treatment with an alkali metal salt, e.g. sodium carbonate, in aqueous alcohol, e.g. aqueous methanol or into the corresponding aliphatic hydrocarbon alcohol of Formula X by treatment with, for example, lithium aluminum hydride.

Typical of the substituted aliphatic hydrocarbon esters, acids and alcohols which can be obtained from the above prepared starting materials are those of the following formulas:

(XVI)

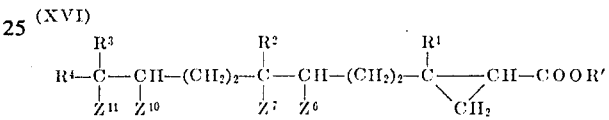

wherein R' is hydrogen or lower alkyl; each of $R^1$, $R^2$, $R^3$ and $R^4$ is lower alkyl;

$Z^6$ is hydrogen, hydroxy, chloro, fluoro or bromo;

$Z^7$ is hydrogen, hydroxy, lower alkoxy, chloro, fluoro, or bromo, or when taken together with $Z^6$, a carbon-carbon double bond or one of the groups

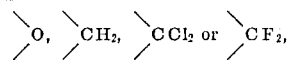

provided that when $Z^6$ is hydroxy, chloro, fluoro or bromo, $Z^7$ is other than hydrogen and when $Z^7$ is hydrogen, $Z^6$ is hydrogen;

$Z^{10}$ is defined the same as $Z^6$; and $Z^{11}$ is defined the same as $Z^7$ and $Z^{11}$ together with $Z^{10}$ is defined the same as $Z^7$ together with $Z^6$.

(XVII)

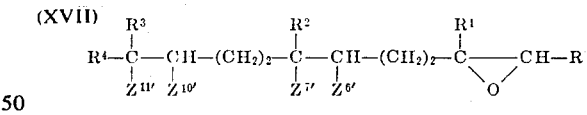

wherein, $R^1$, $R^2$, $R^3$ and $R^4$ are defined the same as above;

$Z^{6'}$ is hydrogen, hydroxy, chloro, fluoro or bromo;

$Z^{7'}$ is hydrogen, hydroxy, lower alkoxy, chloro, fluoro, or bromo, or when taken together with $Z^{6'}$, a

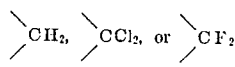

group, provided that when $Z^{6'}$ is hydroxy, chloro, fluoro or bromo, $Z^{7'}$ is other than hydrogen and when $Z^{7'}$ is hydrogen, $Z^{6'}$ is hydrogen;

$Z^{10'}$ is defined the same as $Z^{6'}$; $Z^{11'}$ is defined the same as $Z^{7'}$ and $Z^{11'}$ together with $Z^{10'}$ is defined the same as $Z^{7'}$ together with $Z^{6'}$; and R is the group -COOR' or -CH$_2$-OR'', wherein R' is hydrogen or lower alkyl and R'' is hydrogen lower alkyl or a carboxylic acyl group.

(XVIII)

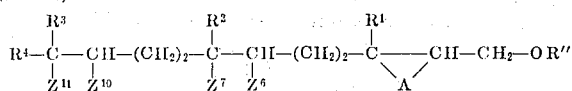

wherein $R^1$, $R^2$, $R^3$, $R^4$, $Z^6$, $Z^7$, $Z^{10}$ and $Z^{11}$ are as defined above in connection with Formula XVI: R'' is hydrogen, lower alkyl, or a carboxylic acyl group; and A is methylene, difluoromethylene, or dichloromethylene.

(XIX)

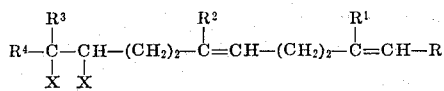

(XX)

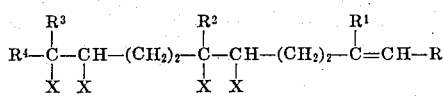

(XXI)

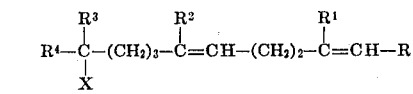

(XXII)

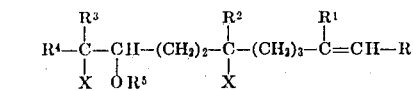

(XXIII)

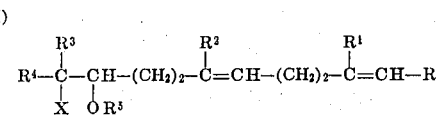

(XXIV)

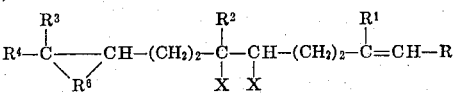

(XXV)

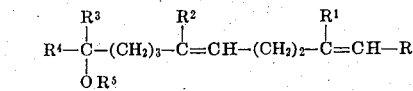

(XXVI)

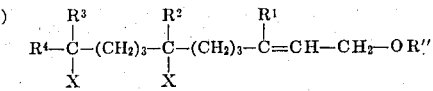

(XXVII)

(XXVIII)

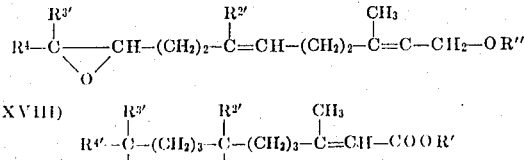

wherein, in the above formulas XIX through XXVIII, each of R, R', R'', $R^1$, $R^2$, $R^3$ and $R^4$ is as defined above;

$R^5$ is hydrogen, lower alkyl or a carboxylic acyl group;

$R^6$ is oxa, methylene, difluoromethylene, or dichloromethylene;

each of $R^{2'}$ and $R^{3'}$ is a lower alkyl of two to six carbon atoms;

and X is chloro, fluoro or bromo.

The term "lower alkyl", as used herein, refers to straight or branched chain saturated aliphatic hydrocarbons having a chain length of one to six carbon atoms, e.g., methyl, ethyl, propyl, i-propyl, s-butyl, i-butyl, and the like. The term "lower alkoxy", as used herein, refers to straight chain alkyloxy groups of one to six carbon atoms.

The addition of a methylene group to an unsaturated position of the molecule can be performed selectively at C—2,3 by the reaction of an unsaturated compound with dimethylsulfoxonium methylide base [prepared in the manner of Corey et al., Journal of the American Chemical Society 87, 1353 (1965)] in dimethylsulfoxide. Addition of the fused methylene group at the C—6,7 and C-10,11 positions follows upon reaction of the unsaturated linkages with methylene iodide and a zinc-copper couple in the manner of Simmons and Smith, J. Am. Chem. Soc. 81, 4256 (1959). Preferably, the addition of the methylene group is conducted on an aliphatic hydrocarbon ester and thereafter the ester can be converted into the corresponding acid or alcohol by the procedures described hereinabove to obtain methylene substituted aliphatic hydrocarbon acids and methylene substituted aliphatic hydrocarbon alcohols. The thus obtained alcohol can then be etherified or esterified according to conventional etherification and esterification processes.

Similarly, the formation of the epoxide is selectively performed at the C—2,3 position by reaction with hydrogen peroxide in aqueous alkali medium, such as is usually provided by sodium hydroxide. Addition of the oxido group at the C—6,7 and C—10,11 positions is performed with m-chloroperbenzoic acid, preferably in methylene chloride or chloroform solution. The formation of an epoxide at C-2,3, C—6,7 and/or C—10,11 in the case of acids and alcohols is preferably accomplished via the appropriate or desired epoxidation of an aliphatic hydrocarbon ester and then conversion of the ester into the acid or alcohol. If a methylene substituent and epoxide are to be introduced on the same backbone, it is preferable to perform the methylene addition first and then carry out epoxidation.

A difluoromethylene group at positions C—6,7 and C—10,11 of an aliphatic hydrocarbon ester can be added by reacting the starting monoene, diene or triene with about 1.2 molar equivalents of trimethyltrifluoromethyl tin in the presence of sodium iodide in benzene/monoglyme solvent at reflux over a period of a few hours. By varying the mole ratio of the two reactants and the temperature and time of reaction, the reaction can be favored toward one or the other 6,7 and 10,11 mono adducts and the 6,7; 10,11 bis adduct. The C—2,3 position is not attacked except under forcing conditions. Thereafter, the ester group can, if desired, be converted into the corresponding acid or alcohol by the procedures described above.

In the case of adding difluoromethylene to an aliphatic hydrocarbon alcohol, introduction at any one of positions C—2,3; C—6,7; and C—10,11 can be accomplished by using about 1.2 molar equivalents of trimethyltrifluoromethyl tin and sodium iodide in monoglyme and refluxing for about 2 hours. Similarly, the bis adducts at C—2,3;6,7, C—2,3;10,11 and C—6,7;10,11 can be prepared by following the above procedure with the exception of using about 2.5 molar equivalents of trimethyltrifluoromethyl tin and sodium iodide and refluxing for about 3 hours. Similarly, the tris adduct can be obtained by using about 5 to 10 molar equivalents of the reagents and refluxing for about 5 to 15 hours. The mono, bis and tris adducts are separable by preparative gas-liquid chromatography.

A fused dichloromethylene group is introduced into an aliphatic hydrocarbon ester by reacting the C—6 or C—10 monoene; C—2,6, C—2,10 or C—6,10 diene; or C—2,6,10 triene thereof with phenyldichlorobromomethyl mercury in benzene at reflux for from one to five hours. The relative yield of the C—6,7 and C—10,11 mono adducts and the C—6,7;10,11 bis adduct varies with the amount of mercury reagent and the reaction conditions employed. Generally, about or slightly more than one molar 4hours, provides the mono adducts predominantly, the bis adduct being favored by use of about 2.5 molar equivalents. The mono and bis adducts are separable by gas-liquid chromatography. These adducts can be converted into the correspondingly substituted aliphatic hydrocarbon acids and alcohol via the procedure described above. In the case of aliphatic hydrocarbon alcohol starting materials, dichloromethylene can be added at C—2,3 in addition to the formation of bis adducts (C—2,3;6,7, C—2,3;10,11, C—6,7;10,11) by following the methods described above for aliphatic hydrocarbon esters and thereafter separating the adducts by gas-liquid chromatography. In addition, by using about 4 to 6 molar equivalents of the mercury reagent and refluxing for about 5 hours, the tris adduct can be obtained from corresponding 2,6,10—triene starting material.

A hydroxy, lower alkoxy, chloro, fluoro or bromo group at one or more positions on the backbone as indicated by formulas XVI through XXVIII can be introduced via a number of methods.

At the C—2,3-position, a monohydroxy substituent is introduced by treating a 2,3-oxido substituted aliphatic hydrocarbon ester with a mole or less of lithium aluminum hydride under mild conditions such as at temperatures of from 0°C to about 30°C for a few minutes, e.g. about 15—30 minutes to furnish the corresponding 1,3-diol and the corresponding 2,3-oxido-1-ol. For the preparation of 3-OH derivatives of aliphatic hydrocarbon esters and acids, a ketone of formula VII above is subjected to Reformatsky reaction (see for example, U.S. Pat. No. 3,031,481).

Etherification is thereafter conducted by methods known per se. For example, the hydroxy group can be treated with sodium hydride followed by an alkyl halide, such as ethyl bromide, to form the desired (lower-)alkoxy group. 2-Halotetrahydropyran and 2-halotetrahydrofuran are utilized for the corresponding tetrahydropyran-2-yl and tetrahydrofuran-2-yl ethers. Acylation is likewise accomplished by known chemical processes, such as through the use of an acid anhydride in the presence of acid catalyst, for example, p-toluenesulfonic acid.

A 2,3-dihydroxy substitution can be accomplished by treating a 2,3-oxido substituted aliphatic hydrocarbon ester with 0.1 to 0.001 N perchloric acid in aqueous solution at room temperature for about 16 hours. A 2-hydroxy-3-lower alkoxy (straight chain) can be formed by similar perchloric acid treatment in a lower straight chain alcohol solvent medium. Alternatively, the 2,3-oxido starting material can be an aliphatic hydrocarbon acid or alcohol to furnish the corresponding C—2 and C—3 substituted compounds.

A 2-hydroxy-3-chloro, fluoro or bromo substitution can be similarly accomplished by treating a 2,3-oxido substituted aliphatic hydrocarbon ester/acid or alcohol with HCl, HF or HBr, respectively.

Each of the C—6,7 and C—10, 11 positions can be similarly substituted. Alternatively, monohydroxy substitution at C—7 and/or C—11 can be carried out by treating the unsaturated aliphatic hydrocarbon with aqueous formic acid as described more fully hereinafter. Thereafter, etherification or esterification can be carried out by the methods described above.

Monohalo (chloro, fluoro or bromo) substitution or introduction can be accomplished by treating an unsaturated aliphatic hydrocarbon ester or acid with hydrogen halide. Selective introduction at C—11 is obtained by treatment of the unsaturated compound with the appropriate hydrogen halide in carbon tetrachloride or other halogenated hydrocarbon solvents of low dielectric constant. Introduction at C—7 and C—7,11 is favored by performing the reaction in diethyl ether or benzene. This halo introduction can be performed using as the starting material either a 6 or 10 monene, 2,10-diene, 2,6-diene, 6,10-diene or 2,6,10-triene unsaturated aliphatic hydrocarbon ester, acid, or alcohol.

Dihalo (Cl, F or Br) introduction at C—10,11 or C—6,7 or tetrahalo introduction at C—6,7,10,11 can be accomplished by treating an unsaturated aliphatic hydrocarbon ester, acid or alcohol with chlorine, fluorine or bromine in a chlorinated hydrocarbon solvent. A mixture of the dihalo and tetrahalo products is obtained which is separable by chromatography. The starting material can be either a monene, diene or triene. The 2-ene is unaffected by the reaction except in the case of aliphatic hydrocarbon alcohols in which case halo substitution at C—2 and C—3 also takes place.

The bishydroxy derivatives ($Z^6=^7$=hydroxy and/or $Z^{10}=Z^{11}$=hydroxy) are prepared from the precursor epoxide (introduced as described above) with aqueous acid as set forth above. Similarly, the procedure given above in the insertion of the 6(10)-hydroxy-7(11)-alkoxy and 6(10)-hydroxy-7(11)-halo substituents analagously apply.

In the preparation of the 6(10)-bromo- and 6(10)-chloro-7(11)-hydroxy compounds, the starting unsaturated compound is treated with the appropriate quantity of N-bromo- or N-chloro-succinimide in aqueous organic solvent, such as dioxane. The corresponding 7(11)-alkoxy compounds are similarly prepared in the presence of dry alkanol solvent. Use of hydrogen fluoride starting with the corresponding oxido compounds affords some of the 6(10)-fluoro-7(11)-hydroxy derivatives. Treatment thereof with acidified alkanol solution affords the corresponding (lower) alkoxy compounds.

In the practice of the above described elaborations on the compounds hereof, relative sensitivities of various groups to certain reaction conditions dictates the preference for a general pattern of reaction sequence. Thus, in accordance herewith, the methyleneation reaction is usually performed initially on the triene. As mentioned, this can be done selectively.

The remaining sites of elaboration are generally epoxidized as the next step. This is particularly true for epoxidations at C—2,3 position for which it is preferred not to have present a halo substituent on the backbone chain. However, since the acidic conditions required for the addition of hydrogen halides cleave the epoxide, it is preferred to insert the oxide after such reactions are performed unless, of course, the epoxide is required for the insertion of the hydroxy(alkoxy)-halo bis-substituents, and the like.

With the exception of the above proviso for the oxido group, the fused halomethylene groups are preferably introduced after the fused methylene and oxido groups are present since these reactions are compatible with these groups.

After all desired elaboration is complete, hydrogenation of any of the unsubstituted double bonds is, if desired, carried out. Halogenation in the instance of introducing a tertiary halo atom is preferably conducted on the desired olefin isolated after hydrogenation.

Certain exceptions to the above general and preferred sequence exist; however, upon slight modification of the reactions according to the purposes desired in the preparation of particular compounds embraced by the present invention, chemical obstacles are overcome. These modifications are, as a whole, obvious to one skilled in the art and/or apparent by the preparative procedures set forth in the examples contained hereinafter.

Separation of the various geometric isomers can be performed at any appropriate or convenient point in the overall process. An advantageous and particular synthetically valuable point at which isomers can be separated by chromatography and the like is at the conclusion of each step of the backbone synthesis, that is, after preparing each of the compounds represented by formulas (VIII), (IX), and (X). Another advantageous point includes that just after the selective addition of the methylene group at C—2,3.

The novel substituted aliphatic hydrocarbon esters, acids and alcohols (including the esters and ethers of said alcohols) of the present invention are arthropod maturation inhibitors. They possess the ability to inhibit the maturation of members of the phylum Arthropoda, particularly, insects, in the passage from metamorphic stage to the next metamorphic stage. Thus, in the case of insects passing from the embryo stage to the larva stage, thence to the pupa stage, and thence to the adult stage, contact with an effective amount of a compound of the present invention, at any of the first three stages, inhibits passage to the next developmental stage with the insect either repeating passage through its present stage or dying. Moreover, these compounds exhibit ovidical properties with insects and are accordingly useful in combating them. These compounds are very potent and thus can be used at extremely low levels, for example, from $10^{-6}$ to $10^{-9}$ g. and are thus advantageously administered over large areas in quantities suitable for the estimated insect population. Generally the substances are liquids and for the purposes herein described, they can be utilized in conjunction with liquid or solid carriers. Typical insects against which these compounds are effective include mealworm, housefly, bollweevil, cornborer, mosquito, cockroach, moth, and the like.

Although not intending to be limited by any theoretical explanation, it appears that the effectiveness of these derivatives can be traced to their ability to mimic the activity of certain so-called "juvenile hormone" substances, such as those described in U.S. Pat. Ser. No. 2,981,655 and Law et al. Proc. Nat. Acad. Sci. 55, 576 (1966). Because of the potency of the compounds of the present invention, they can be employed at extremely low concentrations, as noted above, to obtain reproducible and predetermined levels of activity. Juvenile hormone substances have been referred to as growth hormone also. Juvenile hormone was identified as methyl 10,11-oxido-7-ethyl-3,11-trimethyltrideca-2,6-dienoate using an extract of cecropia moths by Roeller et al., Angew. Chem. internat. Edit. 6, 179 (February, 1967) and Chemical & Engineering News, 48—49 (Apr. 10, 1967). A second juvenile hormone from the same source has been identified as methyl 10,11-oxido-3,7,11-trimethyl-trideca-2,6-dienoate by Meyer et al., "The Two Juvenile Hormones from the Cecropia Silk Moth," Zoology (Proc. N.A.S.) 60, 853 (1968). In addition to the natural juvenile hormones and the unidentified mixture of Law et al. above, some synthetic terpenoids have been reported to exhibit juvenile hormone activity -- Bowers et al., Life Sciences (Oxford) 4, 2323 (1965) - methyl 10,11-oxido-3,7,11-trimethyldodeca-2,6-dienoate; Williams et al., Journal of Insect Physiology 11, 569 (1965); BioScience 18, No. 8, 791 (August, 1968); Williams, Scientific American 217, No. 1, 13 (July, 1967); Science 154, 248 (October 14, 1966); Romanuk et al., Proc. Nat. Acad. Sci. 57, 349 (February, 1967) - 7,11-dichloro of esters of farnesoic acid - Canadian Pat. 795,805 (1968); Masner et al., Nature 219, 395 (July 27, 1968); U.S. Pat. No. 3,429,970 and 3,453,362 - farnesene derivatives.

The presence of at least one and optionally two double bonds in the foregoing compounds permits the existence of geometric isomerism in the configuration of these compounds. This isomerism occurs with regard to the double bond bridging the C—2,3 carbon atoms, the C—6,7 atoms, and C—10,11 atoms. Obviously, isomerism at the C—10,11 carbon atoms occurs only when $R^3$ and $R^4$ are different alkyl groups.

Thus, the isomers are the cis and trans of the monoene series and the cis,cis; cis,trans; trans,cis; and trans,-trans of the diene series; each of which isomers in each series being included within the scope of this invention. Preferably, the isomerism relative to the double bond between C—2 and C—3 is trans. Each of these isomers are separable from the reaction mixture by which they are prepared by virtue of their different physical properties via conventional techniques, such as chromatography, including thin-layer and gas-liquid chromatography and fractional distillation.

The following examples will serve to further typify the nature of this invention. In some instances, the various isomeric forms are specified; however, in any of the reaction steps, the carbon-carbon double bonds can be cis or trans independent of the other or, isomeric mixtures can be employed.

EXAMPLE 1

Part A

To a solution of 20.9 g. of the ethylene ketal of 1-bromo-4pentanone (obtained by treating 1-bromo-4-pentanone with ethylene glycol in benzene in the presence of p-toluenesulfonic acid) in 100 ml. of benzene is added 20 g. of triphenylphosphine. This mixture is heated at reflux temperature for two hours and then filtered. The solid material thus collected is washed with benzene, dried in vacuo, and added to 6.49 g. of butyl lithium in 50 ml. of dimethylsulfoxide. This mixture is stirred until an orange solution is obtained and 3.8 g. of methyl ethyl ketone is then added. This mixture is stirred at about 25°C for about 8 hours, poured into water, and this mixture is extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to yield a mixture of the cis and trans isomer of 6-methyl-5octen-2-one which is separated by preparative gas-liquid chromatography into the individual isomers.

Part B

To a solution of 20.9 g. of the ethylene ketal of 1-bromo-4-pentanone in 100 ml. of benzene is added 20 g. of triphenylphosphine. This mixture is heated at reflux temperature for 2 hours and then filtered. The solid material thus collected is washed with benzene, dried in vacuo, and added to 6.49 g. of butyl lithium in 50 ml. of dimethylsulfoxide. This mixture is stirred until an orange solution is obtained and 5.5 g. of trans 6-methyl-5-octen-2-one (the ketone obtained in Part A) is then added. This mixture is stirred at about 25°C for about 8 hours, poured into water, and this mixture is extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to furnish a mixture of the trans, trans and cis, trans isomers of 6,10-dimethyldodeca-5,9-dien-2-one which is separated by preparative gas-liquid chromatography to the individual isomers.

By repeating the above procedure with the exception of using cis 6-methyl-5-octen-2-one in place of trans 6-methyl-5-octen-2-one, there is obtained a mixture of the cis, cis and trans, cis isomers of 6,10-dimethyldodeca-5,9-dien-2-one which is separated as described above.

Similarly, in the above procedure, instead of using either the trans or cis isomers of 6-methyl-5-octen-2-one as the starting material, there can be used a mixture of the isomers obtained in Part A in which case a mixture of the four isomers is obtained which can then be separated by preparative gas-liquid chromatography into the four isomers.

Part C

A mixture of 11.2 g. of diethyl carbomethoxy methylphosphonate in 100 ml. of diglyme is treated with 2.4 g. of sodium hydride. This mixture is stirred until the evolution of gas ceases and 7.5 g. of trans, trans 6,10-dimethyldodeca-5,9-dien-2 -one is then slowly added with stirring, maintaining a temperature below 30°C. The mixture is stirred for about 15 minutes and then diluted with water and extracted with ether. These ethereal extracts are washed well with water, dried over sodium sulfate and evaporated to remove the solvent to furnish a mixture of the trans,trans,trans and cis,trans,-trans isomers of methyl 3,7,11-trimethyltrideca-2,6,10-trienoate which is separated by preparative gas-liquid chromatography.

The above procedure is repeated with the exception of using cis,trans 6,10-dimethyldodeca-5,9-dien-2-one as the starting material in place of the trans,trans isomer and there is obtained a mixture of the cis,cis,trans and trans, cis,trans isomers of methyl 3,7,11-trimethyltrideca-2,6,10-trienoate.

Similarly, in the above procedure, in place of using either the trans,trans or cis,trans isomer of 6,10-dimethyldodeca-5,9-dien-2-one as the starting material, there can be used as the starting material a mixture of isomers obtained in Part B and thereafter separating the individual isomers by preparative gas-liquid chromatography.

In the examples which follow, in some instances the isomeric forms are not specified; however, in each of the procedures set forth in the following examples, reference to the compound or compounds named is inclusive of each isomer or isomeric mixtures thereof. In other words, the following examples are illustrative of procedures which are applicable to compounds embracing individual isomers or isomeric mixtures of the type set forth hereinabove.

EXAMPLE 2

By repeating the process of Example 1 with the exceptions that in Part A thereof, methul ethyl ketone is replaced with the ketones listed in column I and the ketone thus obtained is used in place of 6-methyl-5-octen-2-one in Part B, there is obtained the acid esters listed in column II.

| I | II |
|---|---|
| acetone | methyl 3,7,11-trimethyldodeca-2,6,10-trienoate |
| methyl n-propyl ketone | methyl 3,7,11-trimethyltetradeca-2,6,10-trienoate |
| diethyl ketone | methyl 3,7-dimethyl-11-ethyltrideca-2,6,10-trienoate |
| methyl i-propyl ketone | methyl 3,7,11,12-tetramethyltrideca-2,6,10-trienoate |
| methyl n-butyl ketone | methyl 3,7,11-trimethylpentadeca-2,6,10-trienoate |
| ethyl n-propyl ketone | methyl 3,7-dimethyl-11-ethyltetradeca-2,6,10-trienoate |
| methyl t-butyl ketone | methyl 3,7,11,12,12-pentamethyltrideca-2,6,10-trienoate |
| methyl i-butyl ketone | methyl 3,7,11,13-tetramethyltetradeca-2,6,10-trienoate |
| methyl s-butyl ketone | methyl 3,7,11,12-tetramethyltetradeca-2,6,10-trienoate |
| ethyl i-propyl ketone | methyl 3,7,12-trimethyl-11-ethyltrideca-2,6,10-trienoate |
| methyl n-amyl ketone | methyl 3,7,11-trimethylhexadeca-2,6,10-trienoate |
| ethyl n-butyl ketone | methyl 3,7-dimethyl-11ethylpentadeca-2,6,10-trienoate |
| 3-ethyl-2-pentanone | methyl 3,7,11-trimethyl-12-ethyltetradeca-2,6,10-trienoate |
| diisopropyl ketone | methyl 3,7,12-trimethyl-11-(i-propyl)-trideca- 2,6,10-trienoate |
| methyl n-hexyl ketone | methyl 3,7,11-trimethylheptadeca-2,6,10-trienoate |
| 5-ethyl-3-heptanone | methyl 3,7-dimethyl-11,13-diethyltetradeca-2,6,10-trienoate |
| 4-decanone | methyl 3,7-dimethyl-11-(n-propyl)-heptadeca-2,6,10-trienoate |
| di-n-amyl ketone | methyl 3,7-dimethyl-11-(n-amyl)-hexadeca-2,6,10-trienoate |
| di-n-hexyl ketone | methyl 3,7-dimethyl-11-(n-hexyl)-heptadeca-2,6,10-trienoate |

EXAMPLE 3

The process of Example 1 is repeated with the exception that in Part A thereof, 1-bromo-4-pentanone is replaced with the 1-bromo-4-ketones listed in Column III to furnish the acid esters listed in Column IV.

| III | IV |
|---|---|
| 1-bromo-4-hexanone | methyl 3,11-dimethyl-7-ethyltrideca-2,6,10-trienoate |
| 1-bromo-4-heptanone | methyl 3,11-dimethyl-7-(n-propyl)-trideca-2,6,10-trienoate |
| 1-bromo-4-octanone | methyl 3,11-dimethyl-7-(n-butyl)-trideca-2,6,10-trienoate |
| 1-bromo-4-nonanone | methyl 3,11-dimethyl-7-(n-amyl)-trideca-2,6,10-trienoate |
| 1-bromo-5-methyl-4-hexanone | methyl 3,11-dimethyl-7-(i-propyl)-trideca-2,6,10-trienoate |
| 1-bromo-6-methyl-4-heptanone | methyl 3,11-dimethyl-7-(i-butyl)-trideca-2,6,10-trienoate |
| 1-bromo-5,5-dimethyl-4-hexanone | methyl 3,11-dimethyl-7-(i-butyl)-trideca-2,6,10-trienoate |

Similarly, by repeating the procedure of Example 2 using the 1-bromo-4-ketones listed in column III in place of 1-bromo-4-pentanone, there is obtained
methyl 3,11-dimethyl-7-ethyldodeca-2,6,10-trienoate,
methyl 3,11-dimethyl-7-(n-propyl)-dodeca-2,6,10-trienoate,
methyl 3,11-dimethyl-7-(n-butyl)-dodeca-2,6,10-trienoate,
methyl 3,11-dimethyl-7-(n-amyl)-dodeca-2,6,10-trienoate,
methyl 3,11-dimethyl-7-(i-propyl)-dodeca-2,6,10-trienoate,
methyl 3,11-dimethyl-7-(i-butyl)-dodeca-2,6,10-trienoate,
methyl 3,11-dimethyl-7-(t-butyl)-dodeca-2,6,10-trienoate,
methyl 3,11-dimethyl-7-ethyltetradeca-2,6,10-trienoate,
methyl 3,11-dimethyl-7-(n-propyl)-tetradeca-2,6,10-trienoate,
methyl 3,11-dimethyl-7-(n-butyl)-tetradeca-2,6,10-trienoate,
methyl 3,11-dimethyl-7-(n-amyl)-tetradeca-2,6,10-trienoate,
methyl 3,11-dimethyl-7-(i-propyl)-tetradeca-2,6,10-trienoate,
methyl 3,11-dimethyl-7-(i-butyl)-tetradeca-2,6,10-trienoate,
methyl 3,11-dimethyl-7-(t-butyl)-tetradeca-2,6,10-trienoate,
methyl 3-methyl-7,11-diethyltrideca-2,6,10-trienoate, methyl 3-methyl-7-(n-propyl)-11-ethyl-trideca-2,6,10-trienoate,
methyl 3-methyl-7-(n-butyl)-11-ethyltrideca-2,6,10-trienoate,
methyl 3-methyl-7-(n-amyl)-11-ethyltrideca-2,6,10-trienoate,
methyl 3-methyl-7-(i-propyl)-11-ethyltrideca-2,6,10-trienoate,
methyl 3-methyl-7-(i-butyl)-11-ethyltrideca-2,6,10-trienoate,
methyl 3-methyl-7-(t-butyl)-11-ethyltrideca-2,6,10-trienoate,
methyl 7-ethyl-3,11,12-trimethyltrideca-2,6,10-trienoate,
methyl 7-(n-propyl)-3,11,12-trimethyltrideca-2,6,10-trienoate,
methyl 7-(n-butyl)-3,11,12-trimethyltrideca-2,6,10-trienoate,
methyl 7-(n-amyl)-3,11,12-trimethyltrideca-2,6,10-trienoate,
methyl 7-(i-propyl)-3,11,12-trimethyltrideca-2,6,10-trienoate,
methyl 7-(i-butyl)-3,11,12-trimethyltrideca-2,6,10-trienoate,
methyl 7-(t-butyl)-3,11,12-trimethyltrideca-2,6,10-trienoate,
methyl 7-ethyl-3,11-dimethylpentadeca-2,6,10-trienoate,
methyl 7-(n-propyl)-3,11-dimethylpentadeca-2,6,10-trienoate,
methyl 7-(n-butyl)-3,11-dimethylpentadeca-2,6,10-trienoate,
methyl 7-(n-amyl)-3,11-dimethylpentadeca-2,6,10-trienoate,
methyl 7-(i-propyl)-3,11-dimethylpentadeca-2,6,10-trienoate,
methyl 7-(i-butyl)-3,11-dimethylpentadeca-2,6,10-trienoate,
methyl 7-(t-butyl)-3,11-dimethylpentadeca-2,6,10-trienoate,
methyl 3-methyl-7,11-diethyltetradeca-2,6,10-trienoate,
methyl 7-(n-propyl)-3-methyl-11-ethyltetradeca-2,6,10-trienoate,
methyl 7-(n-butyl)-3-methyl-11-ethyltetradeca-2,6,10-trienoate,
methyl 7-(n-amyl)-3-methyl-11-ethyltetradeca-2,6,10-trienoate,
methyl 7-(i-propyl)-3-methyl-11-ethyltetradeca-2,6,10-trienoate,
methyl 7-(i-butyl)-3-methyl-11-ethyltetradeca-2,6,10-trienoate,
methyl 7-(t-butyl)-3-methyl-11-ethyltetradeca-2,6,10-trienoate,
methyl 7-ethyl-3,11,12,12-tetramethyltrideca-2,6,10-trienoate,
methyl 7-(n-propyl)-3,11,12,12-tetramethyltrideca-2,6,10-trienoate,
methyl 7-(n-butyl)-3,11,12,12-tetramethyltrideca-2,6,10-trienoate,
methyl 7-(n-amyl)-3,11,12,12-tetramethyltrideca-2,6,10-trienoate,
methyl 7-(i-propyl)-3,11,12,12-tetramethyltrideca-2,6,10-trienoate,
methyl 7-(i-butyl)-3,11,12,12-tetramethyltrideca-2,6,10-trienoate, and
methyl 7-(t-butyl)-3,11,12,12-tetramethyltrideca-2,6,10-trienoate, respectively.

EXAMPLE 4

The process of Example 1 is repeated with the exception that in Part B, 1-bromo-4-pentanone is replaced with the 1-bromo-4-ketones listed in Column III above furnishing the following acid esters:
methyl 7,11-dimethyl-3-ethyltrideca-2,6,10-trienoate,
methyl 7,11-dimethyl-3-(n-propyl)-trideca-2,6,10-trienoate,
methyl 7,11-dimethyl-3-(n-butyl)-trideca-2,6,10-trienoate,
methyl 7,11-dimethyl-3-(n-amyl)-trideca-2,6,10-trienoate,
methyl 7,11-dimethyl-3-(i-propyl)-trideca-2,6,10-trienoate,
methyl 7,11-dimethyl-3-(i-butyl)-trideca-2,6,10-trienoate, methyl 7,11-dimethyl-3-(t-butyl)-trideca-2,6,10-trienoate.

Similarly, by repeating the procedure of Example 2 with the exception that the 1-bromo-4-ketones listed in Column III are used in place of 1-bromo-4-pentanone in Part B of Example 1, there is obtained methyl 7,11-dimethyl-3-ethyldodeca-2,6,10-trienoate,
methyl 7,11-dimethyl-3-(n-propyl)-dodeca-2,6,10-trienoate,
methyl 7,11-dimethyl-3-(n-butyl)-dodeca-2,6,10-trienoate,
methyl 7,11-dimethyl-3-(n-amyl)-dodeca-2,6,10-trienoate,
methyl 7,11-dimethyl-3-(i-propyl)-dodeca-2,6,10-trienoate,
methyl 7,11-dimethyl-3-(i-butyl)-dodeca-2,6,10-trienoate,
methyl 7,11-dimethyl-3-(t-butyl)-dodeca-2,6,10-trienoate,
methyl 7,11-dimethyl-3-ethyltetradeca-2,6,10-trienoate,
methyl 3-(n-propyl)-7,11-dimethyltetradeca-2,6,10-trienoate,
methyl 3-(n-butyl)-7,11-dimethyltetradeca-2,6,10-trienoate,
methyl 3-(n-amyl)-7,11-dimethyltetradeca-2,6,10-trienoate,
methyl 3-(i-propyl)-7,11-dimethyltetradeca-2,6,10-trienoate,
methyl 3-(i-buty)-7,11-dimethyltetradeca-2,6,10-trienoate,
methyl 3-(t-butyl)-7,11-dimethyltetradeca-2,6,10-trienoate,
methyl 3,11-diethyl-7-methyltrideca-2,6,10-trienoate,
methyl 3-(n-propyl)-7-methyl-11-ethyltrideca-2,6,10-trienoate,
methyl 3-(n-butyl)-7-methyl-11-ethyltrideca-2,6,10-trienoate,
methyl 3-(n-amyl)-7-methyl-11-ethyltrideca-2,6,10-trienoate,
methyl 3-(i-propyl)-7-methyl-11-ethyltrideca-2,6,10-trienoate,
methyl 3-(i-butyl)-7-methyl-11-ethyltrideca-2,6,10-trienoate,
methyl 3-(t-butyl)-7-methyl-11-ethyltrideca-2,6,10-trienoate,
methyl 3-ethyl-7,11,12-trimethyltrideca-2,6,10-trienoate,
methyl 3-(n-propyl)-7,11,12-trimethyltrideca-2,6,10-trienoate,
methyl 3-(n-butyl)-7,11,12-trimethyltrideca-2,6,10-trienoate,
methyl 3-(n-amyl)-7,11,12-trimethyltrideca-2,6,10-trienoate,
methyl 3-(i-propyl)-7,11,12-trimethyltrideca-2,6,10-trienoate,
methyl 3-(i-butyl)-7,11,12-trimethyltrideca-2,6,10-trienoate
methyl 3-(t-butyl)-7,11,12-trimethyltrideca-2,6,10-trienoate,
methyl 7,11-dimethyl-3-ethylpentadeca-2,6,10-trienoate,
methyl 3-(n-propyl)-7,11-dimethylpentadeca-2,6,10-trienoate,
methyl 3-(n-butyl)-7,11-dimethylpentadeca-2,6,10-trienoate,
methyl 3-(n-amyl)-7,11-dimethylpentadeca-2,6,10-trienoate,
methyl 3-(i-propyl)-7,11-dimethylpentadeca-2,6,10-trienoate,
methyl 3-(i-butyl)-7,11-dimethylpentadeca-2,6,10-trienoate,
methyl 3-(t-butyl)-7,11-dimethylpentadeca-2,6,10-trienoate,
methyl 3,11-diethyl-7-methyltetradeca-2,6,10-trienoate,
methyl 3-(n-propyl)-7-methyl-11-ethyltetradeca-2,6,10-trienoate,
methyl 3-(n-butyl)-7-methyl-11-ethyltetradeca-2,6,10-trienoate,
methyl 3-(n-amyl)-7-methyl-11-ethyltetradeca-2,6,10-trienoate,
methyl 3-(i-propyl)-7-methyl-11-ethyltetradeca-2,6,10-trienoate,
methyl 3-(i-butyl)-7-methyl-11-ethyltetradeca-2,6,10-trienoate,
methyl 3-(t-butyl)-7-methyl-11-ethyltetradeca-2,6,10-trienoate,
methyl 3-ethyl-7,11,12,12-tetramethyltrideca-2,6,10-trienoate,
methyl 3-(n-propyl)-7,11,12,12-tetramethyltrideca-2,6,10-trienoate,
methyl 3-(n-butyl)-7,11,12,12-tetramethyltrideca-2,6,10-trienoate,
methyl 3-(n-amyl)-7,11,12,12-tetramethyltrideca-2,6,10-trienoate,
methyl 3-(i-propyl)-7,11,12,12-tetramethyltrideca-2,6,10-trienoate,
methyl 3-(i-butyl)-7,11,12,12-tetramethyltrideca-2,6,10-trienoate,
methyl 3-(t-butyl)-7,11,12,12-tetramethyltrideca-2,6,10-trienoate,
methyl 3-ethyl-7,11,13-trimethyltetradeca-2,6,10-trienoate,
methyl 3-(n-propyl)-7,11,13-trimethyltetradeca-2,6,10-trienoate,
methyl 3-(n-butyl)-7,11,13-trimethyltetradeca-2,6,10-trienoate,
methyl 3-(n-amyl)-7,11,13-trimethyltetradeca-2,6,10-trienoate,
methyl 3-(i-propyl)-7,11,13-trimethyltetradeca-2,6,10-trienoate,
methyl 3-(i-butyl)-7,11,13-trimethyltetradeca-2,6,10-trienoate,
methyl 3-(t-butyl)-7,11,13-trimethyltetradeca-2,6,10-trienoate,
methyl 3-ethyl-7,11,12-trimethyltetradeca-2,6,10-trienoate,
methyl 3-(n-propyl)-7,11,12-trimethyltetradeca-2,6,10-trienoate,
methyl 3-(n-butyl)-7,11,12-trimethyltetradeca-2,6,10-trienoate,
methyl 3-(n-amyl)-7,11,12-trimethyltetradeca-2,6,10-trienoate,
methyl 3-(i-propyl)-7,11,12-trimethyltetradeca-2,6,10-trienoate,
methyl 3-(i-butyl)-7,11,13-trimethyltetradeca-2,6,10-trienoate,
methyl 3-(t-butyl)-7,11,13-trimethyltetradeca-2,6,10-trienoate, methyl 3,11-diethyl-7,12-dimethyltrideca-2,6,10-trienoate,
methyl 3-(n-propyl)-7,12-dimethyl-11-ethyltrideca-2,6,10-trienoate,
methyl 3-(n-butyl)-7,12-dimethyl-11-ethyltrideca-2,6,10-trienoate,
methyl 3-(n-amyl)-7,12-dimethyl-11-ethyltrideca-2,6,10-trienoate,
methyl 3-(i-propyl)-7,12-dimethyl-11-ethyltrideca-2,6,10-trienoate,
methyl 3-(i-butyl)-7,12-dimethyl-11-ethyltrideca-2,6,10-trienoate,
methyl 3-(t-butyl)-7,12-dimethyl-11-ethyltrideca-2,6,10-trienoate,
methyl 3-ethyl-7,11-dimethylhexadeca-2,6,10-trienoate,
methyl 3-(n-propyl)-7,11-dimethylhexadeca-2,6,10-trienoate,
methyl 3-(n-butyl)-7,11-dimethylhexadeca-2,6,10-trienoate,
methyl 3-(n-amyl)-7,11-dimethylhexadeca-2,6,10-trienoate,
methyl 3-(i-propyl)-7,11-dimethylhexadeca-2,6,10-trienoate,
methyl 3-(i-butyl)-7,11-dimethylhexadeca-2,6,10-trienoate,
methyl 3-(t-butyl)-7,11-dimethylhexadeca-2,6,10-trienoate,
methyl 3,11-diethyl-7-methylpentadeca-2,6,10-trienoate,
methyl 3-(n-propyl)-7-methyl-11-ethylpentadeca-2,6,10-trienoate,
methyl 3-(n-butyl)-7-methyl-11-ethylpentadeca-2,6,10-trienoate,
methyl 3-(n-amyl)-7-methyl-11-ethylpentadeca-2,6,10-trienoate,
methyl 3-(i-propyl)-7-methyl-11-ethylpentadeca-2,6,10-trienoate,
methyl 3-(i-butyl)-7-methyl-11-ethylpentadeca-2,6,10-trienoate,
methyl 3-(t-butyl)-7-methyl-11-ethylpentadeca-2,6,10-trienoate,
methyl 3-(t-butyl)-7-methyl-11-ethylpentadeca-2,6,10-trienoate,
methyl 3,11,12-triethyl-7-methyltetradeca-2,6,10-trienoate,
methyl 3-(n-propyl)-7-methyl-11,12-diethyltetradeca-2,6,10-trienoate,
methyl 3-(n-butyl)-7-methyl-11,12-diethyltetradeca-2,6,10-trienoate,
methyl 3-(n-amyl)-7-methyl-11,12-diethyltetradeca-2,6,10-trienoate,
methyl 3-(i-propyl)-7-methyl-11,12-diethyltetradeca-2,6,10-trienoate,
methyl 3-(i-butyl)-7-methyl-11,12-diethyltetradeca-2,6,10-trienoate,
methyl 3-(t-butyl)-7-methyl-11,12-diethyltetradeca-2,6,10-trienoate,
methyl 3-ethyl-11-(i-propyl)-7,12-dimethyltrideca-2,6,10-trienoate,
methyl 3-(n-propyl)-11-(i-propyl)-7,12-dimethyltrideca-2,6,10-trienoate,
methyl 3-(n-butyl)-11-(i-propyl)-7,12-dimethyltrideca-2,6,10-trienoate,
methyl 3-(n-amyl)-11-(i-propyl)-7,12-dimethyltrideca-2,6,10-trienoate,
methyl 3,11-[di(i-propyl)]-7,12-dimethyltrideca-2,6,10-trienoate,
methyl 3-(i-butyl)-11-(i-propyl)-7,12-dimethyltrideca-2,6,10-trienoate,
methyl 3-(t-butyl)-11-(i-propyl)-7,12-dimethyltrideca-2,6,10-trienoate,
methyl 3-ethyl-7,11-dimethylheptadeca-2,6,10-trienoate,
methyl 3-(n-propyl)-7,11-dimethylheptadeca-2,6,10-trienoate,
methyl 3-(n-butyl)-7,11-dimethylheptadeca-2,6,10-trienoate,
methyl 3-(n-amyl)-7,11-dimethylheptadeca-2,6,10-trienoate,
methyl 3-(i-propyl)-7,11-dimethylheptadeca-2,6,10-trienoate,
methyl 3-(i-butyl)-7,11-dimethylheptadeca-2,6,10-trienoate,
methyl 3-(t-butyl)-7,11-dimethylheptadeca-2,6,10-trienoate,
methyl 7-methyl-3,11,13-triethyltetradeca-2,6,10-trienoate,
methyl 3-(n-propyl)-7-methyl-11,13-diethyltetradeca-2,6,10-trienoate,
methyl 3-(n-butyl)-7-methyl-11,13-diethyltetradeca-2,6,10-trienoate,
methyl 3-(n-amyl)-7-methyl-11,13-diethyltetradeca-2,6,10-trienoate,
methyl 3-(i-propyl)-7-methyl-11,13-diethyltetradeca-2,6,10-trienoate,
methyl 3-(i-butyl)-7-methyl-11,13-diethyltetradeca-2,6,10-trienoate,
methyl 3-(t-butyl)-7-methyl-11,13-diethyltetradeca-2,6,10-trienoate,
methyl 3-ethyl-7-methyl-11-(n-propyl)-heptadeca-2,6,10-trienoate,
methyl 3,11-[di(n-propyl)]-7-methylheptadeca-2,6,10-trienoate,
methyl 3-(n-butyl)-11-(n-propyl)-7-methylheptadeca-2,6,10-trienoate,
methyl 3-(n-amyl)-11-(n-propyl)-7-methylheptadeca-2,6,10-trienoate,
methyl 3-(i-propyl)-11-(n-propyl)-7-methylheptadeca-2,6,10-trienoate,
methyl 3-(i-butyl)-11-(n-propyl)-7-methylheptadeca-2,6,10-trienoate,
methyl 3-(t-butyl)-11-(n-propyl)-7-methylheptadeca-2,6,10-trienoate,
methyl 3-ethyl-7-methyl-11-(n-amyl)-hexadeca-2,6,10-trienoate,
methyl 3-(n-propyl)-7-methyl-11-(n-amyl)-hexadeca-2,6,10-trienoate,
methyl 3-(n-butyl)-7-methyl-11-(n-amyl)-hexadeca-2,6,10-trienoate,
methyl 3,11-[di(n-amyl)]-7-methylhexadeca-2,6,10-trienoate,
methyl 3-(i-propyl)-7-methyl-11-(n-amyl)-hexadeca-2,6,10-trienoate,
methyl 3-(i-butyl)-7-methyl-11-(n-amyl)-hexadeca-2,6,10-trienoate,
methyl 3-(t-butyl)-7-methyl-11-(n-amyl)-hexadeca-2,6,10-trienoate,
methyl 3-ethyl-7-methyl-11-(n-hexyl)-heptadeca-2,6,10-trienoate,
methyl 3-(n-propyl)-7-methyl-11-(n-hexyl)-heptadeca-2,6,10-trienoate, methyl 3-(n-butyl)-7-methyl-11-(n-hexyl)-heptadeca-2,6,10-trienoate,
methyl 3-(n-amyl)-7-methyl-11-(n-hexyl)-heptadeca-2,6,10-trienoate,
methyl 3-(i-propyl)-7-methyl-11-(n-hexyl)-heptadeca-2,6,10-trienoate,
methyl 3-(i-butyl)-7-methyl-11-(n-hexyl)-heptadeca-2,6,10-trienoate, and
methyl 3-(t-butyl)-7-methyl-11-(n-hexyl)-heptadeca-2,6,10-trienoate, respectively.

Likewise, by repeating the procedure of Example 3 with the exception that the 1-bromo-4-ketones listed in Column III are used in place of 1-bromo-4-pentanone in Part B of Example 1, there is obtained
methyl 3,7-diethyl-11-methyltrideca-2,6,10-trienoate,
methyl 3-(n-propyl)-7-ethyl-11-methyltrideca-2,6,10-trienoate,
methyl 3-(n-butyl)-7-ethyl-11-methyltrideca-2,6,10-trienoate,
methyl 3-(n-amyl)-7-ethyl-11-methyltrideca-2,6,10-trienoate,
methyl 3-(i-propyl)-7-ethyl-11-methyltrideca-2,6,10-trienoate,
methyl 3-(i-butyl)-7-ethyl-11-methyltrideca-2,6,10-trienoate,
methyl 3-(t-butyl)-7-ethyl-11-methyltrideca-2,6,10-trienoate,
methyl 3-ethyl-7-(n-propyl)-11-methyltrideca-2,6,10-trienoate,
methyl 3,7-[di(n-propyl)]-11-methyltrideca-2,6,10-trienoate,
methyl 3-(n-butyl)-7-(n-propyl)-11-methyltrideca-2,6,10-trienoate,
methyl 3-(n-amyl)-7-(n-propyl)-11-methyltrideca-2,6,10-trienoate,
methyl 3-(i-propyl)-7-(n-propyl)-11-methyltrideca-2,6,10-trienoate,
methyl 3-(i-butyl)-7-(n-propyl)-11-methyltrideca-2,6,10-trienoate,
methyl 3-(t-butyl)-7-(n-propyl)-11-methyltrideca-2,6,10-trienoate,
methyl 3-ethyl-7-(n-propyl)-11-methyltrideca-2,6,10-trienoate,
methyl 3-(n-propyl)-7-(n-butyl)-11-methyltrideca-2,6,10-trienoate,
methyl 3,7-[di(n-butyl)]-11-methyltrideca-2,6,10-trienoate,
methyl 3-(n-amyl)-7-(n-butyl)-11-methyltrideca-2,6,10-trienoate,
methyl 3-(i-propyl)-7-(n-butyl)-11-methyltrideca-2,6,10-trienoate,
methyl 3-(i-butyl)-7-(n-butyl)-11-methyltrideca-2,6,10-trienoate,
methyl 3-(t-butyl)-7-(n-butyl)-11-methyltrideca-2,6,10-trienoate,
methyl 3-ethyl-7-(n-amyl)-11-methyltrideca-2,6,10-trienoate,
methyl 3-(n-propyl)-7-(n-amyl)-11-methyltrideca-2,6,10-trienoate,
methyl 3-(n-butyl)-7-(n-amyl)-11-methyltrideca-2,6,10-trienoate,
methyl 3,7-[di(n-amyl)]-11-methyltrideca-2,6,10-trienoate,
methyl 3-(i-propyl)-7-(n-amyl)-11-methyltrideca-2,6,10-trienoate,
methyl 3-(i-butyl)-7-(n-amyl)-11-methyltrideca-2,6,10-trienoate,
methyl 3-(t-butyl)-7-(n-amyl)-11-methyltrideca-2,6,10-trienoate,
methyl 3-ethyl-7-(i-propyl)-11-methyltrideca-2,6,10-trienoate,
methyl 3-(n-propyl)-7-(i-propyl)-11-methyltrideca-2,6,10-trienoate,
methyl 3-(n-butyl)-7-(i-propyl)-11-methyltrideca-2,6,10-trienoate,
methyl 3-(n-amyl)-7-(i-propyl)-11-methyltrideca-2,6,10-trienoate,
methyl 3,7-[di(i-propyl)]-11-methyltrideca-2,6,10-trienoate,
methyl 3-(i-butyl)-7-(i-propyl)-11-methyltrideca-2,6,10-trienoate,
methyl 3-(t-butyl)-7-(i-propyl)-11-methyltrideca-2,6,10-trienoate,
methyl 3-ethyl-7-(i-butyl)-11-methyltrideca-2,6,10-trienoate,
methyl 3-(n-propyl)-7-(i-butyl)-11-methyltrideca-2,6,10-trienoate,
methyl 3-(n-butyl)-7-(i-butyl)-11-methyltrideca-2,6,10-trienoate,
methyl 3-(n-amyl)-7-(i-butyl)-11-methyltrideca-2,6,10-trienoate,
methyl 3-(i-propyl)-7-(i-butyl)-11-methyltrideca-2,6,10-trienoate,
methyl 3,7-[di(i-butyl)]-11-methyltrideca-2,6,10-trienoate,
methyl 3-(t-butyl)-7-(i-butyl)-11-methyltrideca-2,6,10-trienoate,
methyl 3-ethyl-7-(t-butyl)-11-methyltrideca-2,6,10-trienoate,
methyl 3-(n-propyl)-7-(t-butyl)-11-methyltrideca-2,6,10-trienoate,
methyl 3-(n-butyl)-7-(t-butyl)-11-methyltrideca-2,6,10-trienoate,
methyl 3-(n-amyl)-7-(t-butyl)-11-methyltrideca-2,6,10-trienoate,
methyl 3-(i-propyl)-7-(t-butyl)-11-methyltrideca-2,6,10-trienoate,
methyl 3-(i-butyl)-7-(t-butyl)-11-methyltrideca-2,6,10-trienoate,
methyl 3,7-[di(t-butyl)]-11-methyltrideca-2,6,10-trienoate, respectively, and similarly,
methyl 3,7-diethyl-11-methyldodeca-2,6,10-trienoate,
methyl 7-(n-propyl)-3-ethyl-11-methyldodeca-2,6,10-trienoate,
methyl 7-(n-butyl)-3-ethyl-11-methyldodeca-2,6,10-trienoate,
methyl 7-(n-amyl)-3-ethyl-11-methyldodeca-2,6,10-trienoate,
methyl 7-(i-propyl)-3-ethyl-11-methyldodeca-2,6,10-trienoate,
methyl 7-(i-butyl)-3-ethyl-11-methyldodeca-2,6,10-trienoate,
methyl 7-(t-butyl)-3-ethyl-11-methyldodeca-2,6,10-trienoate,
methyl 3,7-diethyl-11-methyltetradeca-2,6,10-trienoate,
methyl 7-(n-propyl)-3-ethyl-11-methyltetradeca-2,6,10-trienoate,
methyl 7-(n-butyl)-3-ethyl-11-methyltetradeca-2,6,10-trienoate, methyl 7-(n-amyl)-3-ethyl-11-methyltetradeca-2,6,10-trienoate,
methyl 7-(i-propyl)-3-ethyl-11-methyltetradeca-2,6,10-trienoate,
methyl 7-(i-butyl)-3-ethyl-11-methyltetradeca-2,6,10-trienoate,
methyl 7-(t-butyl)-3-ethyl-11-methyltetradeca-2,6,10-trienoate,
methyl 3,7,11-triethyltrideca-2,6,10-trienoate,
methyl 7-(n-propyl)-3,11-diethyltrideca-2,6,10-trienoate,
methyl 7-(n-butyl)-3,11-diethyltrideca-2,6,10-trienoate,
methyl 7-(n-amyl)-3,11-diethyltrideca-2,6,10-trienoate,
methyl 7-(i-propyl)-3,11-diethyltrideca-2,6,10-trienoate,
methyl 7-(i-butyl)-3,11-diethyltrideca-2,6,10-trienoate,
methyl 7-(t-butyl)-3,11-diethyltrideca-2,6,10-trienoate,
methyl 3,7-diethyl-11-methylpentadeca-2,6,10-trienoate,
methyl 7-(n-propyl)-3-ethyl-11-methylpentadeca-2,6,10-trienoate,
methyl 7-(n-butyl)-3-ethyl-11-methylpentadeca-2,6,10-trienoate,
methyl 7-(n-amyl)-3-ethyl-11-methylpentadeca-2,6,10-trienoate,
methyl 7-(i-propyl)-3-ethyl-11-methylpentadeca-2,6,10-trienoate,
methyl 7-(i-butyl)-3-ethyl-11-methylpentadeca-2,6,10-trienoate,
methyl 7-(t-butyl)-3-ethyl-11-methylpentadeca-2,6,10-trienoate,
methyl 3,7,11-triethyltetradeca-2,6,10-trienoate,
methyl 7-(n-propyl)-3,11-diethyltetradeca-2,6,10-trienoate,
methyl 7-(n-butyl)-3,11-diethyltetradeca-2,6,10-trienoate,
methyl 7-(n-amyl)-3,11-diethyltetradeca-2,6,10-trienoate,
methyl 7-(i-propyl)-3,11-diethyltetradeca-2,6,10-trienoate,
methyl 7-(i-butyl)-3,11-diethyltetradeca-2,6,10-trienoate,
methyl 7-(t-butyl)-3,11-diethyltetradeca-2,6,10-trienoate,
methyl 3,7-diethyl-11,12,12-trimethyltrideca-2,6,10-trienoate,
methyl 7-(n-propyl)-3-ethyl-11,12,12-trimethyltrideca-2,6,10-trienoate, and the like.

EXAMPLE 5

The procedure of Example 1 is repeated with the exception that in Part C, diethyl carbomethoxy methyl phosphonate is replaced with other dialkyl carboalkoxy methyl phosphonates, e.g., diethyl carbethoxy methyl phosphonate, diethyl n-propoxycarbonyl methyl phosphonate, dimethyl n-butoxycarbonyl methyl phosphonate, and the like, to furnish the corresponding alkyl 3,7,11-trimethyltrideca-2,6,10-trienoate, e.g. ethyl 3,7,11-trimethyltrideca-2,6,10-trienoate, n-propyl 3,7,11-trimethyltri-deca-2,6,10-trienoate, n-butyl 3,7,11-trimethyltrideca-2,6,10-trienoate, and the like.

Similarly, by repeating the procedure of Examples 2, 3 and 4 with the exception that diethyl carbomethoxy methyl phosphonate is replaced with diethyl carbethoxy methyl phosphonate, diethyl n-propoxycarbonyl methyl phosphonate and dimethyl n-butoxycarbonyl methyl phosphonate, the corresponding ethyl 2,6,10-trienoates, n-propyl 2,6,10-trienoates and n-butyl 2,6,10-trienoates are obtained. For example,
ethyl 3,7,11-trimethyldodeca-2,6,10-trienoate,
n-propyl 3,7,11-trimethyldodeca-2,6,10-trienoate,
n-butyl 3,7,11-trimethyldodeca-2,6,10-trienoate,
ethyl 3,11-dimethyl-7-ethyltrideca-2,6,10-trienoate,
n-propyl 3,11-dimethyl-7-ethyltrideca-2,6,10-trienoate,
n-butyl 3,11-dimethyl-7-ethyltrideca-2,6,10-trienoate,
ethyl 3,11-dimethyl-7-ethyldodeca-2,6,10-trienoate,
n-propyl 3,11-dimethyl-7-ethyldodeca-2,6,10-trienoate,
n-butyl 3,11-dimethyl-7-ethyldodeca-2,6,10-trienoate,
ethyl 3-ethyl-7,11-dimethyltrideca-2,6,10-trienoate,
n-propyl 3-ethyl-7,11-dimethyltrideca-2,6,10-trienoate,
n-butyl 3-ethyl-7,11-dimethyltrideca-2,6,10-trienoate,
ethyl 3-ethyl-7,11-dimethyldodeca-2,6,10-trienoate,
n-propyl 3-ethyl-7,11-dimethyldodeca-2,6,10-trienoate,
n-butyl 3-ethyl-7,11-dimethyldodeca-2,6,10-trienoate,
ethyl 3,7-diethyl-11-methyltrideca-2,6,10-trienoate,
n-propyl 3,7-diethyl-11-methyltrideca-2,6,10-trienoate,
n-butyl 3,7-diethyl-11-methyltrideca-2,6,10-trienoate, and the like.

EXAMPLE 6

A mixture of 1 g. of methyl 3,7,11-trimethyltrideca-2,6,10-trienoate, 60 ml. of methanol, 0.1 g. of sodium carbonate, and 6 ml. of water is heated at reflux for two hours. The mixture is then cooled, diluted with water and extracted with ether. The ethereal extracts are washed with water, dried over sodium sulfate and evaporated to remove the solvent. The residue is subjected to fractional vacuum distillation to yield 3,7,11-trimethyltrideca-2,6,10-trienoic acid.

By repeating the procedure of this example with the exception of substituting the other acid esters, preferably the methyl esters or ethyl esters obtained by the above procedures (Examples 2, 3, 4 and 5) for methyl 3,7,11-trimethyltrideca-2,6,10-trienoate, there is obtained the corresponding free acids, e.g. 3,7,11-trimethyldodeca-2,6,10-trienoic acid, 3,11-dimethyl-7-ethyltrideca-2,6,10-trienoic acid, 3,7-diethyl-11-methyltrideca-2,6,10-trienoic acid, 3,11-dimethyl-7-ethyldodeca-2,6,10-trienoic acid, 7,11-dimethyl-3-ethyltrideca-2,6,10-trienoic acid, 7,11-dimethyl-3-ethyldodeca-2,6,10-trienoic acid, and the like.

EXAMPLE 7

A suspension of 0.5 g. of 5% palladium-on-carbon catalyst in 50 ml. of benzene is hydrogenated for 30 minutes. A solution of 2 g. of 6,10-dimethyldodeca-5,9-dien-2-one in 100 ml. of benzene is added and hydrogenated with agitation until the theoretical amount of hydrogen has been absorbed. The catalyst is thereafter removed by filtration and the solution is evaporated to yield 6,10-dimethyldodec-5-en-2-one, 6,10- dimethyldodec-9-en-2-one and 6,10-dimethyldodecan-2-one which are separated and purified by preparative gas-liquid chromatography.

EXAMPLE 8

By repeating the procedure of Part A of Example 1 using, for example, the ketones listed in Column V in lieu of methyl ethyl ketone and using the ketone thus obtained for the procedure of Part B of Example 1, there are obtained the respective products listed in Column VI which are hydrogenated using the procedure of Example 7 to afford 6,10-dimethylundec-5-en-2-one, 6,10-dimethylundec-9-en-2-one, and 6,10-dimethyl-undecan-2-one; 6-methyl-10-ethyldodec-5-en-2-one, 6-methyl-10- ethyldodec-9-en-2-one, and 6-methyl-10-ethyldodecan-2-one; 6,10,11-trimethyldodec-5-en-2-one, 6,10,11-trimethyldodec-9- en-2-one, and 6,10,-11-trimethyldodecan-2-one; 6-methyl-10- ethyltridec-5-en-2-one, 6-methyl-10-ethyltridec-9-en-2-one, and 6-methyl-10-ethyltridecan-2-one; and 6,10,11,11-tetramethyl dodec-5-en-2-one, 6,10,11,11-tetramethyldodec-9-en-2-one, and 6,10,11,11-tetramethyldodecan-2-one, respectively.

| V | VI |
|---|---|
|  | 6,10-dimethylundeca-5,9-dien-2-one |
| diethyl ketone | 6-methyl-10-ethyldodeca-5,9-dien-2-one |
| methyl i-propyl ketone | 6,10,11-trimethyldodeca-5,9-dien-2-one |
| ethyl n-propyl ketone | 6-methyl-10-ethyltrideca-5,9-dien-2-one |
| methyl t-butyl ketone | 6,10,11,11-tetramethyldodeca-5,9-dien-2-one |

By repeating the procedure of Part C of Example 1 using diethyl carbethoxymethyl phosphonate in place of diethyl carbomethoxymethyl phosphonate and using the mono-unsaturated and saturated 2-ketones prepared in this example in place of 6,10-dimethyldodeca-5,9-dien-2-one, the following ethyl esters are obtained:
ethyl 3,7,11-trimethyldodeca-2,6-dienoate,
ethyl 3,7,11-trimethyldodeca-2,10-dienoate,
ethyl 3,7,11-trimethyldodec-2-enoate,
ethyl 3,7-dimethyl-11-ethyltrideca-2,6-dienoate,
ethyl 3,7-dimethyl-11-ethyltrideca-2,10-dienoate,
ethyl 3,7-dimethyl-11-ethyltridec-2-enoate,
ethyl 3,7,11,12-tetramethyltrideca-2,6-dienoate,
ethyl 3,7,11,12-tetramethyltrideca-2,10-dienoate,
ethyl 3,7,11,12-tetramethyltridec-2-enoate,
ethyl 3,7-dimethyl-11-ethyltetradeca-2,6-dienoate,
ethyl 3,7-dimethyl-11-ethyltetradeca-2,10-dienoate,
ethyl 3,7-dimethyl-11-ethyltetradec-2-enoate,
ethyl 3,7,11,12,12-pentamethyltrideca-2,6-dienoate,
ethyl 3,7,11,12,12-pentamethyltrideca-2,10-dienoate, and
ethyl 3,7,11,12,12-pentamethyltridec-2-enoate, respectively.

EXAMPLE 9

By repeating the procedure of Part A of Example 1 using the 1-bromo-4-alkanones listed in Column VII in place of 1-bromo-4-pentanone, the corresponding ketones listed in Column VIII are obtained which are used in Part B of Example 1 to afford the diunsaturated ketones listed in Column IX. The diunsaturated ketones are hydrogenated using the procedure of Example 7 to yield 6-ethyl-10-methyldodec-5-en-2-one, 6-ethyl-10-methyldodec-9-en-2-one, and 6-ethyl-10-methyldodecan-2-one; 6-(n-propyl)-10-methyldodec-5-en-2-one, 6-(n-propyl)-10-methyl-dodec-9-en-2-one, and 6-(n-propyl)-10-methyldodecan-2-one; 6-(i-propyl)-10-methyldodec-5-en-2-one, 6-(i-propyl)-10-methyldodec-9-en-2-one, and 6-(i-propyl)-10-methyldodecan-2-one; and 6-(t-butyl)-10-methyldodec-5-en-2-one, 6-(t-butyl)-10-methyldodec-9-en-2-one, and 6-(t-butyl)-10-methyldodecan-2-one, respectively.

| VII | VIII | IX |
|---|---|---|
| 1-bromo-4-hexanone | 7-methylnon-6-en-3-one | 6-ethyl-10-dodeca-5,9-dien-2-one |
| 1-bromo-4-heptanone | 8-methyldec-7-en-4-one | 6-(n-propyl)-10-methyldodeca-5,9-dien-2-one |
| 1-bromo-5-methyl-4-hexanone | 2,7-dimethylnon-6-en-3-one | 6-(i-propyl)-10-methyldodeca-5,9-dien-2-one |
| 1-bromo-5,5-dimethyl-4-hexanone | 2,2,7-trimethylnon-6-en-3-one | 6-(t-butyl)-10-methyldodeca-5,9-dien-2-one |

By repeating the procedure of Part C of Example 1 using diethyl carbethoxymethyl phosphonate in place of diethyl carbomethoxymethyl phosphonate and using the mono-unsaturated and saturated 2-ketones prepared in this example in place of 6,10-dimethyldodeca-5,9-dien-2-one, the following ethyl esters are obtained:
ethyl 3,11-dimethyl-7-ethyltrideca-2,6-dienoate,
ethyl 3,11-dimethyl-7-ethyltrideca-2,10-dienoate,
ethyl 3,11-dimethyl-7-ethyltridec-2-enoate,
ethyl 3,11-dimethyl-7-(n-propyl)-trideca-2,6-dienoate,
ethyl 3,11-dimethyl-7-(n-propyl)-trideca-2,10-dienoate,
ethyl 3,11-dimethyl-7-(n-propyl)-tridec-2-enoate,
ethyl 3,11-dimethyl-7-(i-propyl)-trideca-2,6-dienoate,
ethyl 3,11-dimethyl-7-(i-propyl)-trideca-2,10-dienoate,
ethyl 3,11-dimethyl-7-(i-propyl)-tridec-2-enoate,
ethyl 3,11-dimethyl-7-(t-butyl)-trideca-2,6-dienoate,
ethyl 3,11-dimethyl-7-(t-butyl)-trideca-2,10-dienoate, and
ethyl 3,11-dimethyl-7-(t-butyl)-tridec-2-enoate, respectively.

EXAMPLE 10

By using the ketones listed in Column VIII in place of 6-methyl-5-octen-2-one and the ethylene ketal of the 1-bromo-4- alkanones listed in Column VII in place of the ethylene ketal of 1-bromo-4-pentanone in Part B of Example 1, there is obtained
7-ethyl-11-methyltrideca-6,10-dien-3-one,
8-(n-propyl)-12-methyltetradeca-7,11-dien-4-one,
2,11-dimethyl-7-(i-propyl)-trideca-6,10-dien-3-one, and
2,2,11-trimethyl-7-(t-butyl)-trideca-6,10-dien-3-one, respectively, which are hydrogenated using the procedure of Example 7 to yield
7-ethyl-11-methyltridec-6-en-3-one,
7-ethyl-11-methyltridec-10-en-3-one, and
7-ethyl-11-methyltridecan-3-one;
8-(n-propyl)-12-methyltetradec-7-en-4-one,
8-(n-propyl)-12-methyltetradec-11-en-4-one, and
8-(n-propyl)-12-methyltetradecan-4-one;
2,11-dimethyl-7-(i-propyl)-tridec-6-en-3-one,
2,11-dimethyl-7-(i-propyl)-tridec-10-en-3-one, and 2,11-dimethyl-7-(i-propyl)-tridecan-3-one; and 2,2,11-trimethyl-7-(t-butyl)-tridec-6-en-3-one, 2,2,11-trimethyl-7-(t-butyl)-tridec-10-en-3-one, and 2,2,11-trimethyl-7-(t-butyl)-tridecan-3-one, respectively.

The thus-obtained mono-unsaturated ketones and saturated ketones are subjected to the procedure of Part C of Example 1 using diethyl carbethoxymethyl phosphonate to obtain the following ethyl esters:

ethyl 3,7-diethyl-11-methyltrideca-2,6-dienoate,
ethyl 3,7-diethyl-11-methyltrideca-2,10-dienoate,
ethyl 3,7-diethyl-11-methyltridec-2-enoate,
ethyl 3,7-(n-propyl)-11-methyltrideca-2,6-dienoate,
ethyl 3,7-(n-propyl)-11-methyltrideca-2,10-dienoate,
ethyl 3,7-(n-propyl)-11-methyltridec-2-enoate,
ethyl 3,7-di(i-propyl)-11-methyltrideca-2,6-dienoate,
ethyl 3,7-di(i-propyl)-11-methyltrideca-2,10-dienoate,
ethyl 3,7-di(i-propyl)-11-methyltridec-2-enoate,
ethyl 3,7-di(t-butyl)-11-methyltrideca-2,6-dienoate,
ethyl 3,7-di(t-butyl)-11-methyltrideca-2,10-dienoate, and
ethyl 3,7-di(t-butyl)-11-methyltridec-2-enoate, respectively.

EXAMPLE 11

The process of Part A of Example 1 is repeated using acetone in place of methyl ethyl ketone and the ethylene ketal of the 1-bromo-4-alkanones listed in Column VII in place of 1-bromo-4-pentanone to afford the compounds listed in Column X which are used in place of 6-methyl-5-octen-2-one in Part B of Example 1 to afford the compounds listed in Column XI.

| X | XI |
|---|---|
| 7-methyloct-6-en-3-one | 6-ethyl-10-methylundeca-3,9-dien-2-one |
| 8-methylnon-7-en-4-one | 6-(n-propyl)-10-methylundeca-5,9-dien-2-one |
| 2,7-dimethyloct-6-en-3-one | 6-(i-propyl)-10-methylundeca-5,9-dien-2-one |
| 2,2,7-trimethyloct-6-en-3-one | 6-(t-butyl)-10-methylundeca-5,9-dien-2-one |

The compounds listed in Column XI are hydrogenated according to the procedure of Example 7 to yield 6-ethyl-10-methylundec-5-en-2-one, 6-ethyl-10-methylundec-9-en-2-one and 6-ethyl-10-methylundecan-2-one; 6-(n-propyl)-10-methylundec-5-en-2-one, 6-(n-propyl)-10-methylundec-9-en-2-one and 6-(n-propyl)-10-methylundecan-2-one; 6-(i-propyl)-10-methylundec-5-en-2-one, 6-(i-propyl)-10-methylundec-9-en-2-one and 6-(i-propyl)-10-methylundecan-2-one; and 6-(t-butyl)-10-methylundec-5-en-2-one, 6-(t-butyl)-10-methylundec-9-en-2-one and 6-(t-butyl)-10-methylun-decan-2-one, respectively.

The thus-obtained mono-unsaturated and saturated ketones are treated with diethyl carbethoxymethylphosphonate using the procedure of Example 1 (Part C) to afford:

ethyl 3,11-dimethyl-7-ethyldodeca-2,6-dienoate,
ethyl 3,11-dimethyl-7-ethyldodeca-2,10-dienoate,
ethyl 3,11-dimethyl-7-ethyldodec-2-enoate,
ethyl 3,11-dimethyl-7-(n-propyl)-dodeca-2,6-dienoate,
ethyl 3,11-dimethyl-7-(n-propyl)-dodeca-2,10-dienoate,
ethyl 3,11-dimethyl-7-(n-propyl)-dodec-2-enoate,
ethyl 3,11-dimethyl-7-(i-propyl)-dodeca-2,6-dienoate,
ethyl 3,11-dimethyl-7-(i-propyl)-dodeca-2,10-dienoate,
ethyl 3,11-dimethyl-7-(i-propyl)-dodec-2-enoate,
ethyl 3,11-dimethyl-7-(t-butyl)-dodeca-2,6-dienoate,
ethyl 3,11-dimethyl-7-(t-butyl)-dodeca-2,10-dienoate, and
ethyl 3,11-dimethyl-7-(t-butyl)-dodeca-2-enoate, respectively.

EXAMPLE 12

The mono-unsaturated ketones listed in Column X are substituted in place of 6-methyl-5-octen-2-one and the ethylene ketal of the 1-bromo-4-hexanone is used in place of the ethylene ketal of 1-bromo-4-pentanone in the process of Example 1 (Part B) to give 7-ethyl-11-methyldodeca-6,10-dien-3-one, 7-(n-propyl)-11-methyldodeca-6,10-dien-3-one, 7-(i-propyl)-11-methyldodeca-6,10-dien-3-one and 7-(t-butyl)-11-methyldodeca-6,10-dien-3-one, respectively, which are hydrogenated using the procedure of Example 7 to yield 7-ethyl-11-methyldodec-6-en-3-one, 7-ethyl-11-methyldodec-10-en-3-one and 7-ethyl-11-methyldodecan-3-one; 7-(n-propyl)-11-methyldodec-6-en-3-one, 7-(n-propyl)-11-methyldo-dec-10-en-3-one and 7-(n-propyl)-11-methyldodecan-3-one; 7-(i-propyl)-11-methyldodec-6-en-3-one, 7-(i-propyl)-11-methyldodec-10-en-3-one and 7-(i-propyl)-11-methyldodecan-3-one; and 7-(t-butyl)-11-methyldodec-6-en-3-one, 7-(t-butyl)-11-methyldodec-10-en-3-one and 7-(t-butyl)-11-methyldodecan-3-one, respectively.

The thus-obtained mono-unsaturated and saturated 3-ketones are treated with diethyl carbethoxymethylphosphonate using the procedure of Example 1 (Part C) to give:

ethyl 3,7-diethyl-11-methyldodeca-2,6-dienoate,
ethyl 3,7-diethyl-11-methyldodeca-2,10-dienoate,
ethyl 3,7-diethyl-11-methyldodec-2-enoate,
ethyl 3-ethyl-7-(n-propyl)-11-methyldodeca-2,6-dienoate,
ethyl 3-ethyl-7-(n-propyl)-11-methyldodeca-2,10-dienoate
ethyl 3-ethyl-7-(n-propyl)-11-methyldodec-2-enoate,
ethyl 3-ethyl-7-(i-propyl)-11-methyldodeca-2,6-dienoate,
ethyl 3-ethyl-7-(i-propyl)-11-methyldodeca-2,10-dienoate,
ethyl 3-ethyl-7-(i-propyl)-11-methyldodec-2-enoate,
ethyl 3-ethyl-7-(t-butyl)11-methyldodeca-2,6-dienoate,
ethyl 3-ethyl-7-(t-butyl)-11-methyldodeca-2,10-dienoate, and
ethyl 3-ethyl-7-(t-butyl)-11-methyldodec-2-enoate, respectively.

By repeating the procedure of this example using the ethylene ketal of the other 1-bromo-4-alkanones listed in Column VII in place of the ethylene ketal of 1-bromo-4-hexanone, the corresponding 3-(n-propyl)-, 3-(i-propyl)-, and 3-(t-butyl)- ethyl esters of the 3-ethyl esters enumerated in the preceding paragraph are obtained, for example, ethyl 3-(n-propyl)-7-ethyl-11-methyldodeca-2,6-dienoate, ethyl 3-(n-propyl)-7-ethyl-11-methyldodeca-2,10-dienoate and ethyl 3-(n- propyl)-7-ethyl-11-methyldodec-2-enoate.

EXAMPLE 13

The procedure of Example 1 (Part A) is repeated using diethyl ketone in place of methyl ethyl ketone and 1-bromo-4-hexanone in place of 1-bromo-4-pentanone to give 7-ethylnon-6-en-3-one. By repeating this procedure using ethyl i-propyl ketone, ethyl n-propyl ketone, ethyl t-butyl ketone, ethyl n-butyl ketone, nd di-i-propyl ketone in place of diethyl ketone, there is obtained 7-(i-propyl)-non-6-en-3-one, 7-ethyldec-6-en-3-one,7-(t-butyl)-non-6-en-3-one, 7-ethylundec-6-en-3-one, and 7-(i-propyl)-8-methyl-non-6-en-3-one, respectively.

The process of Example 1 (Part B) is repeated using the thus-obtained alk-6-en-3-one's in place of 6-methyl-5-octen-2-one and the ethylene ketal of 1-bromohexan-4-one in place of the ethylene ketal of 1-bromopentan-4-one to afford 7,11-diethyltrideca-6,10-dien-3-one, 11-(i-propyl)-7-ethyltrideca-6,10-dien-3-one, 7,11-diethyltetradeca-6,10-dien-3-one, 11-(t-butyl)-7-ethyltrideca-6,10-dien-3-one, 7,11-diethylpentadeca-6,10-dien-3-one and 7-ethyl-11-(i-propyl)-12-methyltrideca-6,10-dien-3-one respectively, which are hydrogenated using the procedure of Example 7 to yield 7,11-diethyltridec-6-en-3-one, 7,11-diethyltridec-10-en-3-one and 7,11-diethyltridecan-3-one; 11-(i-propyl)-7-ethyltridec-6-en-3-one, 11-(i-propyl)-7-ethyltridec-10-en-3-one and 11-(i-propyl)-7-ethyltridecan-3-one; 7,11-diethyltetradec-6-en-3-one, 7,11-diethyltetradec-10-en-3-one and 7,11-diethyltetradecan-3-one; 11-(t-butyl)-7-ethyltridec-6-en-3-one, 11-(t-tubyl)-7-ethyltridec-10-en-3-one and 11-(t-butyl)-7-ethyltridecan-3-one; 7,11-diethylpentadec-6-en-3-one, 7,11-diethylpentadec-10-en-3-one and 7,11-diethylpentadecan-3-one; and 7 ethyl-11-(i-propyl)-12-methyltridec-6-en-3-one, 7-ethyl-11-(i-propyl)-12-methyltridec-10-en-3-one and 7-ethyl-11-(i-propyl)-12-methyltridecan-3-one, respectively, each of which are treated with diethyl carbethoxymethylphosphonate using the procedure of Example 1 (Part C) to afford:

ethyl 3,7,11-triethyltrideca-2,6-dienoate,
ethyl 3,7,11-triethyltrideca-2,10-dienoate,
ethyl 3,7,11-triethyltridec-2-enoate,
ethyl 3,7,11-triethyl-12-methyltrideca-2,6-dienoate,
ethyl 3,7,11-triethyl-12-methyltrideca-2,10-dienoate,
ethyl 3,7,11-triethyl-12-methyltrideca-2-enoate,
ethyl 3,7,11-triethyltetradeca-2,6-dienoate,
ethyl 3,7,11-triethyltetradeca-2,10-dienoate,
ethyl 3,7,11-triethyltetradec-2-enoate,
ethyl 3,7,11-triethyl-12,12-dimethyltrideca-2,6-dienoate,
ethyl 3,7,11-triethyl-12,12-dimethyltrideca-2,10-dienoate,
ethyl 3,7,11-triethyl-12,12-dimethyltridec-2-enoate,
ethyl 3,7,11-triethylpentadeca-2,6-dienoate,
ethyl 3,7,11-triethylpentadeca-2,10-dienoate,
ethyl 3,7,11-triethylpentadec-2-enoate,
ethyl 3,7-diethyl-11-(i-propyl)-12-methyltrideca-2,6-dienoate,
ethyl 3,7-diethyl-11-(i-propyl)-12-methyltrideca-2,10-dienoate, and
ethyl 3,7-diethyl-11-(i-propyl)-12-methyltridec-2-enoate, respectively.

EXAMPLE 14

Each of 6,10-dimethyldodec-5-en-2-one, 6,10-dimethyldodec-9-en-2-one and 6,10-dimethyl-dodecan-2-one is treated with diethyl carbethoxymethylphosphonate using the procedure of Example 1 (Part C) to yield ethyl 3,7-trimethyltrideca-2,6-dienoate, ethyl 3,7,11-trimethyltrideca-2,10-dienoate and ethyl 3,7,11-trimethyltridec-2-enoate, respectively.

EXAMPLE 15

To a solution of 10 g. of methyl 3,7,11-trimethyltrideca-2,6,10-trienoate in 50 ml. of benzene is added 1.2 molar equivalents of trimethyltrifluoromethyl tin and 1.2 molar equivalents of sodium iodide in 10 ml. of monoglyme. The mixture is refluxed for 2 hours after which it is cooled, wahsed with water, and evaporated to an oil which is purified and separated by gas-liquid chromatography to give methyl 6,7-difluoromethylene-3,7,11-trimethyltrideca-2,10-dienoate, methyl 10,11-difluoromethylene-3,7,11-trimethyltrideca-2,6-dienoate and methyl 6,7;10,11-(bis) difluoromethylene-3,7,11-trimethyltridec-2-enoate.

By repeating the above process with the exceptions of using 2.5 molar equivalents of trimethyltrifluoromethyl tin and sodium iodide, a predominate amount of the 6,7;10,11-bis(difluoromethylene) is obtained.

EXAMPLE 16

To a solution of 10 g. of methyl 3,7,11-trimethyltrideca-2,6,10-trienoate in 50 ml. of benzene is added 1.2 molar equivalents of phenyldichlorobromomethyl mercury. The mixture is refluxed for 4 hours after which it is cooled and evaporated to an oil which is purified and separated by silica chromatogrphy to give methyl 6,7-dichloromethylene-3,7,11-trimethyltrideca-2,10-dienoate, methyl 10,11-dichloromethylene-3,7,11-trimethyltrideca-2,6-dienoate, and methyl 6,7;-10,11-(bis)dichloromethylene-3,7,11-trimethyltridec-2-enoate.

By repeating the above process using 2.5 molar equivalents of phenyldichlorobromo-methyl mercury, there is obtained predominatly the 6,7;10,11-(bis)dichloromethylene compound.

We claim:

1. A compound selected from those of the following formula:

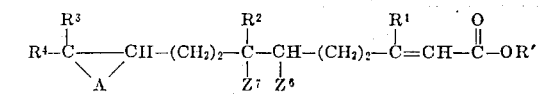

wherein,

R' is hydrogen or lower alkyl;
each of $R^1$, $R^2$, $R^3$ and $R^4$ is lower alkyl;
$Z^6$, whent taken separately, is hydrogen;
$Z^7$, when taken separately, is hydrogen;
$Z^6$ and $Z^7$, when taken together, form a carbon-carbon bond, the group

or the group

and A is the group

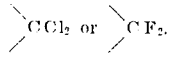

2. A compound according to claim 1 of the following formula:

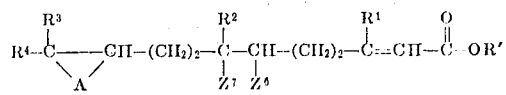

wherein,
R' is hydrogen or lower alkyl;
each of $R^1$, $R^2$, $R^3$, and $R^4$ is methyl or ethyl;
$Z^6$, when taken separately, is hydrogen;
$Z^7$, when taken separately, is hydrogen;
$Z^6$ and $Z^7$, taken together, form a carbon-carbon bond; and
A is the group

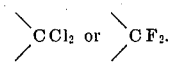

3. A compound according to claim 2 wherein R' is lower alkyl; each of $R^1$, $R^2$ and $R^3$ is methyl; and $R^4$ is methyl or ethyl.

4. The compound, methyl 10,11-dichloromethylene-3,7,11-trimethyltrideca-2,6-dienoate, according to claim 3.

5. The compound, methyl 6,7;10,11-(bis)dichloromethylene-3,7,11-trimethyltridec-2-enoate, according to claim 1.

6. The compound, methyl 10,11-difluoromethylene-3,7,11-trimethyltrideca-2,6-dienoate, according to claim 3.

7. The compound, methyl 6,7;10,11-(bis)difluoromethylene-3,7,11-trimethyltridec-2-enoate, according to claim 1.

* * * * *